INVENTORS:
JOHANNES SCHMITT
& HANS SCHAPER,
BY

THEIR ATTORNEY

United States Patent Office 3,434,945
Patented Mar. 25, 1969

3,434,945
TERMINAL VOLTAGE REGULATION IN ELECTROLYTIC ALUMINUM PRODUCTION
Johannes Schmitt and Hans Schaper, Rheinfelden, Baden, Germany, assignors to Swiss Aluminium Ltd., Chippis, Switzerland, a corporation of Switzerland
Filed Aug. 27, 1964, Ser. No. 392,485
Claims priority, application Switzerland, Aug. 30, 1963, 10,777/63
Int. Cl. C22d 3/12
U.S. Cl. 204—67       13 Claims

ABSTRACT OF THE DISCLOSURE

For regulating the terminal voltage in an installation for the electrolytic production of aluminum in a fused fluoride melt by adjusting the distances between the electrodes, a regulator is connected to an electrolytic cell during succeeding electrolysis periods. As long as a predetermined threshold voltage is not surpassed, the regulator during the time of its connection will transmit regulating pulses as required. After this threshold voltage is surpassed, however, the regulator will transmit only one regulating pulse; and, upon surpassing a still higher voltage level, will cease to transmit any regulating pulse until, after the addition of alumina into the melt, the voltage decreases and there commences a new regulating cycle.

---

The invention relates to terminal voltage regulation in electrolytic aluminum production in a fused fluoride melt, and relates more particularly to methods of and means for automatically carrying out the aforesaid regulation.

It is known to regulate the terminal voltage automatically in an installation, such as a furnace, for the electrolytic production of aluminum in a fused fluoride melt by adjusting the distance between the underside of the anode and the surface of the metal deposited at the cathode, which is called here the distance between the poles. An apparatus designed for this purpose is described, for example, in British Patent No. 602,876.

The present invention is based on the recognition that the development of the anode effect, which is necessary from time to time for the purpose of regenerating the electrolyte, must not be disturbed. Continuous regulation of the voltage steadily reduces the distance between the poles, because the anode is lowered each time an increase in the terminal voltage causes the response level to be reached. In other words, the gradual rise in the terminal voltage is employed to cause a decrease in the distance between the poles.

In a normal electrolytic cell, after the crust which covers the fused fluoride melt has been broken and the $Al_2O_3$ has been added, the terminal voltage increases by about 5 to 10%, for example from 4 to 4.2 or 4.4 v., until the next anode effect is initiated. Actually, a drop in the voltage would be expected because of the rise in temperature occurring and also because of the lowering of the $Al_2O_3$ content. There are experts who attribute the rise in the voltage to an increase in the polarization. From tests carried out by the applicants, however, it appears to be evident that an increase in the ohmic resistance is responsible for the increase in the voltage; presumably, there is a connection between the wetting of the anode by the electrolyte and increase in the ohmic resistance at the surface of contact between the electrolyte and the anode. The increase in the ohmic resistance amounts, for instance, to about 27%; from a terminal voltage of 4 v. there must be deducted, for example, 0.6 v. for the voltage loss in the leads and in the anodes and 1.7 v. for the polarization, which yields a value of, for instance, 1.7 v. for the voltage drop due to ohmic resistance.

In the known methods of regulating the terminal voltage, the distance between the poles gradually reaches before the beginning of an anode effect a value which is too low and results in disturbances in the process of electrolysis. One form of disturbance consists in that too much electrolyte is displaced laterally with the result that electrolyte escapes over the furnace rim. Another form of disturbance occurs in case of too great a decrease in the distance between the poles, because the flow of current becomes irregular and concentrates at a number of preferred points; violent electrodynamic and thermal eddies thereby occur in the fused melt electrolyte and result in a loss of metal through re-oxidation. Even independently of these eddies, if the distance between the poles is too small, a deterioration of the current yield occurs owing to re-oxidation.

It is accordingly among the principal objects of the present invention to obtain the advantages of regulation of the terminal voltage of such a furnace by adjusting the distance between the poles, without the disadvantages of the prior art described above.

It is a further object of the invention to connect the regulator to an electrolytic cell throughout a short interval of each of a series of successive electrolyses, wherein in one voltage range the regulator transmits several regulating pulses, in another voltage range the regulator transmits only one pulse and thereby effects only a limited regulation, and beyond which the regulator ceases to transmit regulating pulses, until after the melting furnace has been serviced by the introduction of alumina into the melting bath, whereby there is again reached a range in which the regulator resumes the transmission of regulating pulses.

Further objects and advantages of the invention will be set forth in part in the following specification and in part will be obvious therefrom without being specifically referred to, the same being realized and attained as pointed out in the claims hereof.

According to the invention the regulator is connected to an electrolytic cell for a short interval in each of a number of successive electrolysis periods of from 5 to 30 minutes, preferably from 10 to 20 minutes, each period for a short interval, for instance of from one-half of 3 minutes, and transmits regulating data or pulses as required during each such interval in response to terminal voltages above the desired or nominal voltage or voltage range but below a threshold level, but supplies only one regulating pulse during the regulating interval in each period when the terminal voltage is between the said threshold level and an upper limiting voltage above the threshold level. Beyond that upper limiting voltage, the regulator ceases to transmit regulating data until the terminal voltage, following introduction of alumina into the bath, again falls below the upper limiting voltage, whereupon the regulator resumes its earlier manner of operation in accordance with the existing terminal voltage.

The desired or nominal value of the terminal voltage is that value which is accepted or recognized as the most favorable for the operation of the electrolytic cell concerned. For example, this value is 4 v. in an 80,000 amps electrolytic cell with a Söderberg anode.

The threshold level which is higher than such desired terminal voltage, is selected in advance and is dependent on the type of cell and on the conditions within the cell as, for example the temperature of the cell during operation. For large cells, it is generally desirable to select a lower value than for small cells. The threshold voltage may be from 0.08 to 0.15 v.; these values, however, can be decreased or increased, for example to 0.07 v. and 0.2 v., respectively.

It will be understood that during the electrolytic operation the regulator does not operate only when the voltage threshold is reached, but also when a pre-set response limit of the apparatus is reached. This may lie, for example, at ±0.05 v. These pre-set response levels may be set with the aid of suitable means, to establish a limit on both sides of the desired or nominal voltage of the terminals of a tolerance range for voltage deviation, so that deviations within that range will not initiate any regulation.

The amount in mm. by which the distance between the poles is adjusted by a single regulating pulse is determined by the mechanical construction, for example the pitch of the lead screw, the motor speed and the gear ratio. When the distance between the poles is adjusted in response to a change in voltage of, for instance, 0.02 v., the duration of the regulating pulse may be, for instance, 1 to 2 seconds and an adjustment of, for example, 0.5 to 1 mm. may then be made. The distance between the poles is adjusted to such an extent by means of the regulating pulse that the voltage decreases or increases in this example by from 0.02 to 0.04 v. The effect of the regulating pulse can be varied within wide limits; the effect, however, is suitably smaller than the difference between the response limits, preferably smaller than one-half of that difference.

Above the voltage threshold there is the above-mentioned upper limiting voltage, also determined in advance, at which the regulator switches itself off, but remains connected to the cell until the regulating period has expired. For example, this upper limiting voltage may lie at 1.0 v. above the desired or nominal value, although it may be as little as 0.5 v. above the desired value. The upper limiting voltage is usually exceeded only when the anode effect is initiated.

When the voltage threshold (which, for example, is at 0.1 v. above the desired or nominal value of the terminal voltage) is exceeded, only one regulating pulse is transmitted and therefore only one regulating operation takes place during the "on" period, namely during the time that the regulator is connected to the electrolytic cell. If, before the next "on" period, the upper limiting voltage is reached or exceeded, the regulator automatically switches off and avoids transmitting a regulating pulse; as mentioned above it remains, however, electrically connected to the cell until the "on" period has expired. In this way, the anode effect can take effect unimpededly. The regulator switches itself on again only when, after the crust has been broken and $Al_2O_3$ has been supplied, the anode effect is eliminated and the terminal voltage has consequently fallen below the upper limiting voltage.

Below the desired or nominal value of the terminal voltage there is likewise a voltage limit determined in advance, which will be referred to as the "lower voltage limit." This lies, for example, at 1 v. below the desired value of the terminal voltage, for instance at 3.0 v. when the latter is 4 v.

The regulator also switches itself off when the terminal voltage reaches or falls below the lower voltage limit; this occurs when the electrolysis current is markedly reduced or the connection of the measuring device to the measuring point is broken. This automatic switching off of the regulator when the lower voltage limit is reached is not a novel characteristic of the method according to the invention, but also takes place in previously known methods; it constitutes a protective measure against faulty control.

In order to explain the invention more fully, reference is had to an exemplification shown in the accompanying drawings, wherein.

Figure 1:
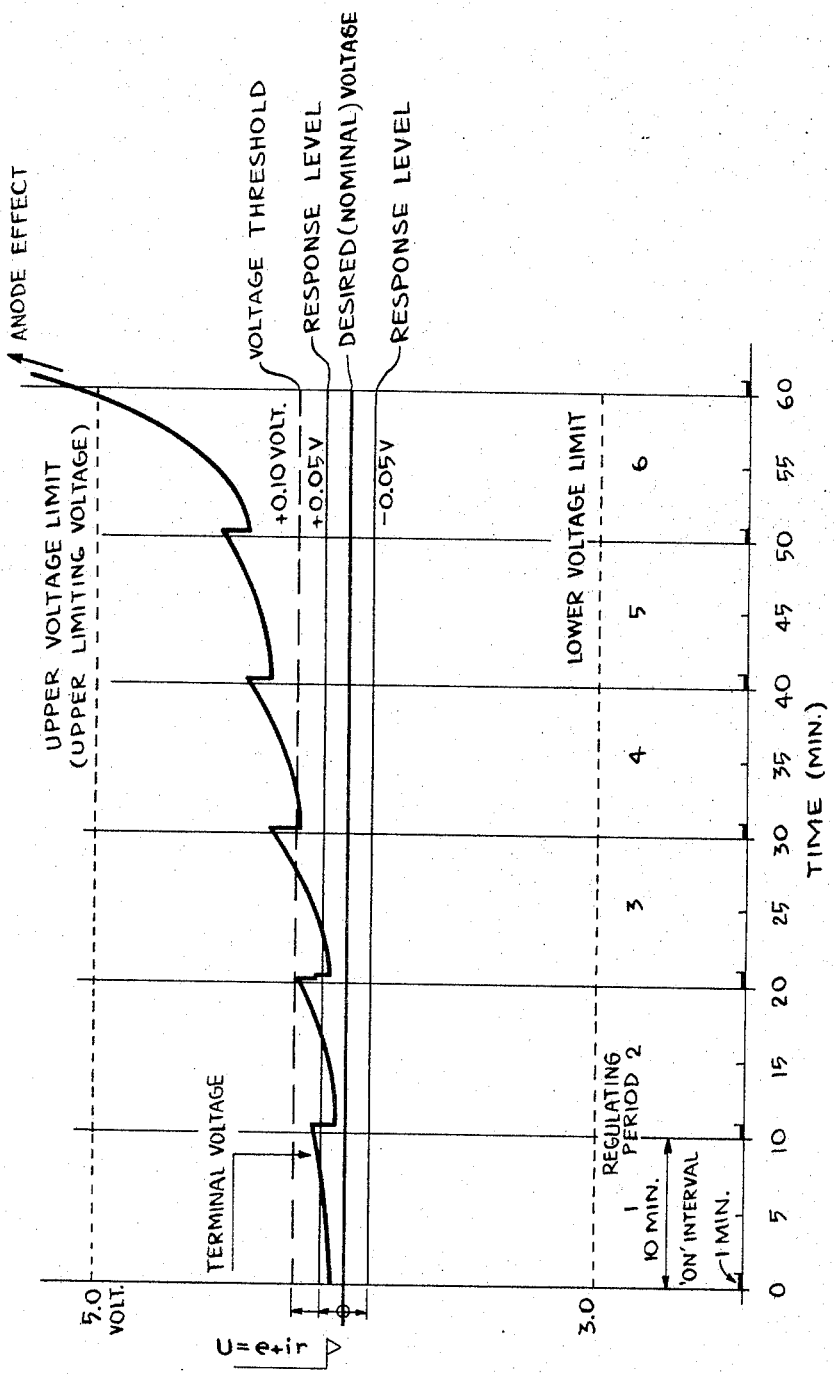
FIG. 1 is a schematic view showing a graph and various pictorial data and ranges.

In the graph of FIG. 1, the values for the desired or nominal voltage, the response levels, the voltage threshold and the voltage limits are plotted in volts along the ordinate, and the time scale for the regulation repetition periods and the "on" or regulating intervals is plotted in minutes along the abscissa. The curve shown in the graph represents the voltage changes in this example, beginning at about one hour before the anode effect and continuing until this effect takes place. In this example, the desired or nominal value of the terminal voltage is 4 v. for a desired or nominal current of 80,000 amps.

The desired value of the terminal voltage ($u$) varies with the electrolytic current in accordance with the following approximative formula.

$$u = e + i \cdot r$$

$e$ means the polarization voltage, that is the partial voltage required for the decomposition considering all electrochemical phenomena, $i$ the instantaneous current, $r$ the ohmic resistance between the terminals which varies principally with the electrode distance, and therefore $i \cdot r$ the partial voltage required to overcome the ohmic resistance.

The graph is made with the hypothesis that the product $i \cdot r$ does not vary during the interval considered and that the desired voltage is therefore constant during that time.

The regulation repetition period in this example is 10 minutes in each instance and the "on" time is 1 minute. The response levels are 0.05 v. above and below the desired or nominal terminal voltage. The voltage threshold is chosen at 0.1 v. above the desired terminal voltage and the upper and lower voltage limits are 1.0 v. above and below the desired terminal voltage.

During the first period, representing the first ten minutes on the graph, no regulating pulse is triggered during the "on" period, namely, during the first minute, since during this period the difference between the terminal voltage and the desired value is less than 0.05 v. and therefore has remained below the response limit.

At the commencement of the second regulating period (10th to 20th minutes), one regulating pulse is transmitted during the "on' period (10th to 11th minute) and carries the terminal voltage back within the tolerance range towards the desired value.

During the "on" period (20th to 21st minute) of the third regulating period (20th to 30th minute), this regulating process is repeated with two pulses. During the remainder of the third regulating period the development to the anode effect begins and the terminal voltage rises above the voltage threshold.

For this reason, during the "on" period (30th to 31st minute) of the fourth regulating period (30th to 40th minute), only one regulating pulse is triggered, whereupon the regulator switches itself off, in fact before the end of the "on" period, so that no further regulating pulse can be transmitted.

During the fifth regulating period (40th to 50th minute), the same regulating process as in the fourth regulating period takes place.

A the commencement of the sixth regulating period (50th to 60th minute), a regulating pulse again occurs and the regulator switches itself off.

At the commencement of the seventh period (60th to

70th minute), there is no further regulating pulse, since the upper limiting voltage has been exceeded, and the regulator allows the polarization effect to develop fully.

In this example, an anode effect is produced which is desirable from time to time for reasons of operation for the purpose of regenerating the electrolyte. Normally, the crust of the electrolytic cell is broken prior to the development of the anode effect, and the cell is charged with aluminum oxide; in this way a drop in the terminal voltage in the range of regulation between the desired voltage and the lower voltage limit is effected, after which the terminal voltage is brought back to the desired voltage during the next "on" periods.

The example shows clearly what is to be understood by the phrase "successive electrolysis periods" or "regulation repetition period" and also by the term "on" period. In the present description, the term "electrolysis period" and the term "regulation repetition period" have the same meaning. An electrolysis or regulating period is that space of time which elapses from the time of connection of the regulator to a cell until the next connection to the same cell. It is apparent from this that the regulator is connected only once to the same cell during an electrolysis or regulating period; during an electrolysis or regulating period there is only one "on" period.

The method according to the invention can be applied to the regulation both of a single cell and of a series of cells, for example a series of 24 80,000 A. cells; in the case of a series of cells, the cells are individually automatically connected to the regulator in succession.

If a series of cells has only one regulator, the cost, of course, is considerably lower than when each individual cell is equipped with a regulator. By series of cells there is to be understood a number of cells which are electrically connected to one another in series. The series of cells is not essentially a complete line of cells; for instance, a line of 100 cells can be divided into five series and equipped with five regulators.

If a cell is equipped with its own regulator, which is used only for this one cell, the regulator must be so arranged that it is connected to the cell only for a short time at intervals of, for example, 20 minutes. The regulator must not act continuously on a cell.

The regulating apparatus for the regulation in accordance with the invention comprises a command device which gives out regulating commands in accordance with the deviations of the terminal voltage of the respective electrolysis furnace from its desired or nominal voltage. The aforesaid device is controlled by two control instruments, one of which limits the extent of regulation during the individual regulating periods, when the terminal voltage either has reached the voltage threshold or has passed it; and the other of which restrains the regulation when the terminal voltage reaches or exceeds the upper voltage.

These regulating commands may either be continuous commands, or pulses. When the commands are in the form of pulses, the device which is set to respond upon reaching of the voltage threshold by switching from "several impulses" to "one pulse," will make this switch as soon as the deviations sensed have reached or exceeded this voltage threshold.

This device, furthermore, is capable of considering, for the formation of the voltage threshold, changes in the desired or nominal voltage which may either be due to variations in the electrolysis current, or due to changes in the furnace resistance, and at any time to add the preset voltage differential to the momentary value of the desired or nominal value.

Furthermore, the regulating apparatus includes a build-up device for the formation of the desired or nominal voltage of the formula $$u = e + i \cdot r$$

this build-up device comprises a voltage stabilizer that delivers a stabilized equilibrium partial voltage, corresponding to "$e$," and a measuring value converter which serves to conduct an equilibrium partial voltage that is proportional to the electrolysis current; and the build-up device thus creates the desired or nominal voltage by adding the aforesaid two partial voltages. This build-up device is then connected to the aforesaid command device, in order to compare the desired voltage with the actual terminal voltage. Both the stabilizer component and the converter component, and if desired also the adding component, which form the desired voltage, are controlled by control instruments which restrain the regulation when any of the components, owing to any defect, either delivers too low a voltage, or when the voltage delivered sinks below the lower voltage limits.

The control instruments described for the control of the upper and lower voltage limits are preferably set at constant values which are independent of the variable desired voltage, and respond upon transgression of said values.

For the sake of safety, there preferably is provided a further control instrument which directly controls the terminal voltage and which restrains the regulation when the terminal voltage sinks below the lower voltage limit.

The response level of the regulator may be determined by its construction. It is possible to provide a special device for determining the response level, which device is connected, by means of an amplifier, to the device for determining the voltage deviations; the aforesaid special device for determining the response level will thus be able to determine the voltage deviations and will permit the regulating commands to become effective only when the sensed deviations surpass the response level. This special device may, for instance, comprise a switch which responds to the occurrence of a minimal voltage differential and which forms the connection to the setting motors of the electrolysis furnace. This has the advance that upon the occurrence of but minor, usually self-correcting, deviations of the terminal voltage, there will not be initiated any regulation; this is particularly important for pulse type regulation where a pulse might invoke a larger voltage correction than the deviation itself.

The various parts needed for building the devices and components of the regulators are well known and readily available on the market, and comprise electromechanical relays and switches, as well as electronic aggregates. They therefore need not be described in detail herein. The instant invention provides for a new electrical connection of these well-known devices, components and parts.

The reference 1 (FIGURE 2) indicates the electrical apparatus controlling the adjustment of the distance between the poles in a series of cells. By adjustment there is to be understood here the raising and lowering of the anodes for the purpose of regulating the voltage by altering the distance between the poles. Such adjusting arrangements are conventional and therefore do not require to be shown in the drawing or described. The apparatus 1 controls the operation of a motor (not shown) which is capable of raising and lowering the anode. Upon receiving commands to raise or, respectively, to lower, the motor will be energized accordingly and will raise or lower the anode until it has reached its proper position.

The reference 2 signifies a connection applying the cell voltage to the control apparatus 1, the reference 3 represents the raising of the anodes and the reference 4 the lowering of the anodes. The square 5 designates diagrammatically the electrical control apparatus for the first cell, the square 6 the electrical control apparatus for the last cell of the series (namely, the number of cells covered by the regulator). The broken lines 7 indicate the cells which are between the first and the last cells of the series. The reference 8 signifies a program switching mechanism which, together with the program time-signal transmitter 9, connects the electrical control apparatus of the cells periodically to the automatic regulator to be described. In the case of 24 cells, for example, the switching mechanism 8 connects the electrical control apparatus of each cell to the automatic regulator for a period of one minute in each instance. The reference 10 indicates the switching of the connection to the cell control units 5, 6, etc., by the program switching mechanism 8.

Figure 3:
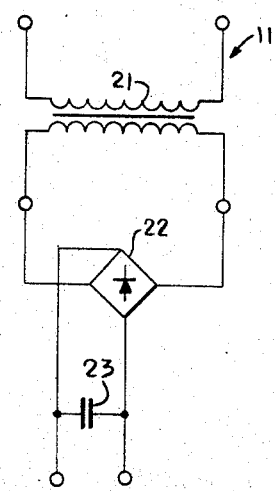
FIG. 3 is a wiring diagram showing in detail a measured value converter 11 of FIG. 2.

The unit 11 is a measured value converter of conventional construction, which forms a voltage proportional to the electrolysis current, ΣJ signifying the sum of the currents supplied by the different power equipments (not shown). As best shown in FIG. 3, the converter 11 comprises a circuit that includes a transformer 21, a rectifier 22, and an electrolytic condenser 23.

Figure 2:
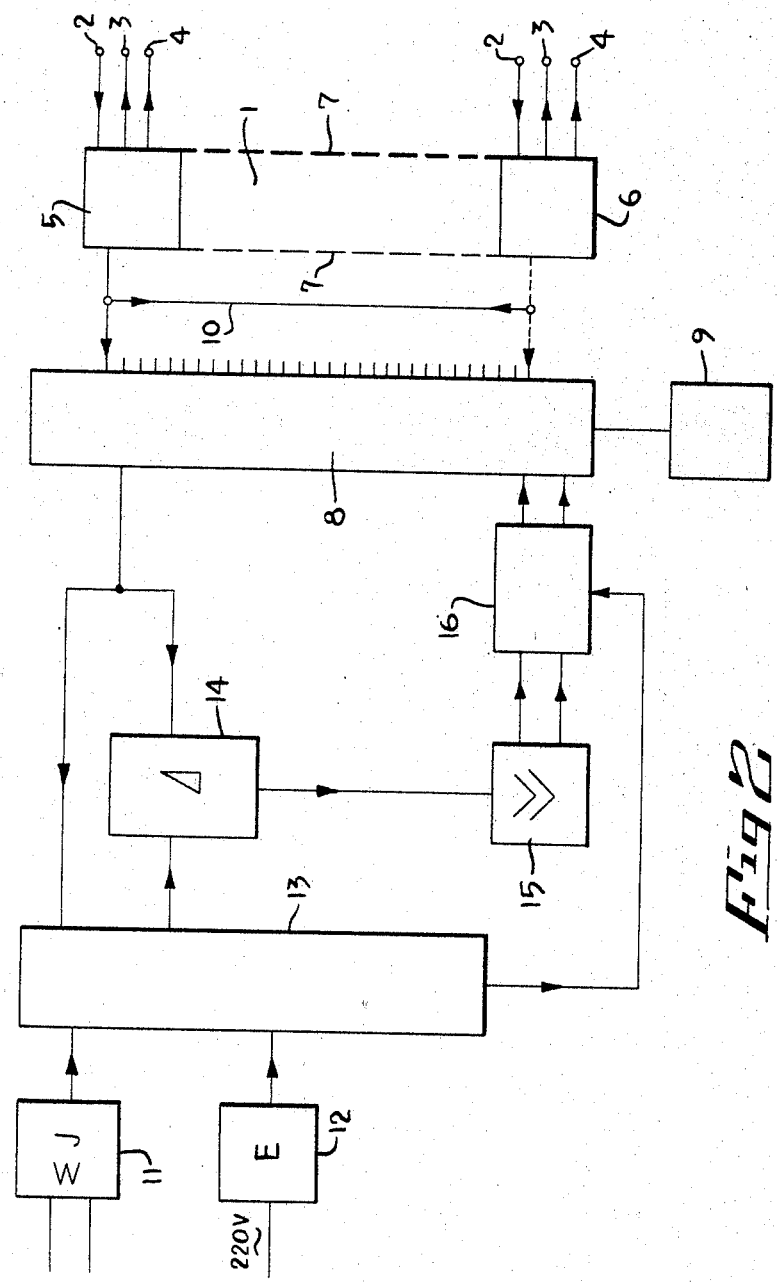
FIG. 2 is a schematic view showing an exemplified diagram of the interconnected elements for the terminal voltage regulation in an installation for the electrolytic production of aluminum.
Figure 4:
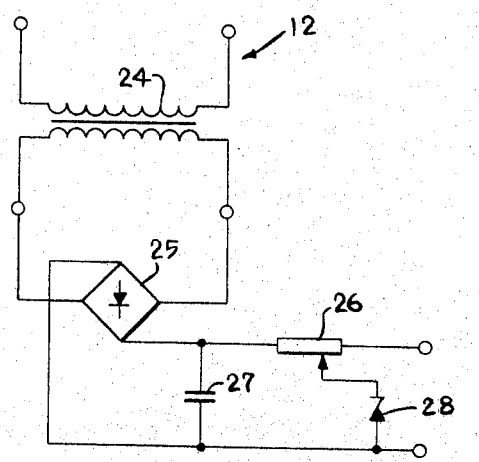
FIG. 4 is a wiring diagram showing in detail a voltage stabilizer 12 of FIG. 2.

In FIGURE 2, is a voltage stabilizer 12 of conventional construction that contains a rectifier and which delivers an adjustable direct current voltage from the alternating current network to a measured-value control device 13. In this device, which is likewise of conventional construction, this direct current voltage is added to that from the converter 11, in order to form the predetermined desired or nominal voltage. As best shown in FIG. 4, the voltage stabilizer 12 comprises a circuit that includes a transformer 24, a rectifier 25, a potentiometer 26, an electrolytic condenser 27 and a diode 28.

Figure 5:
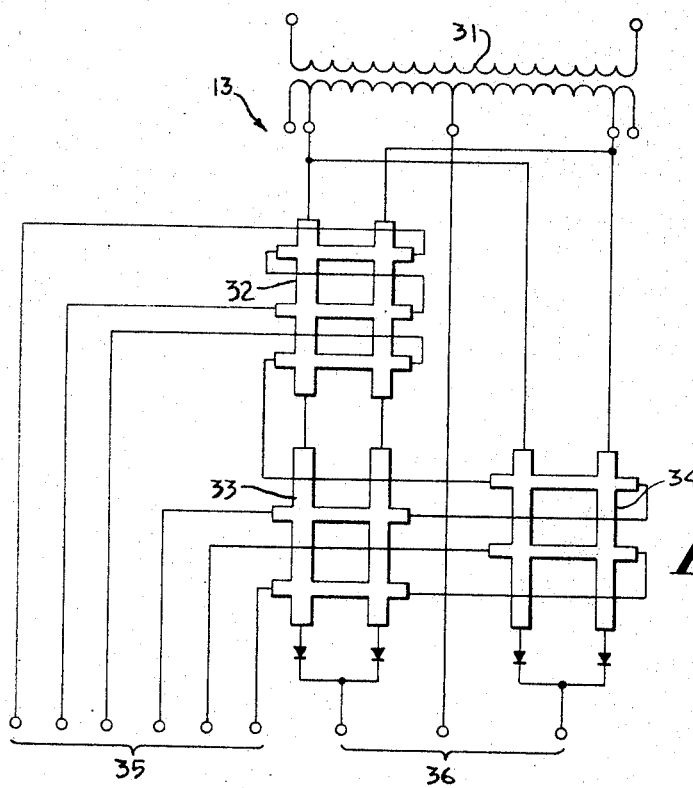
FIG. 5 is a wiring diagram showing in detail a control device 13 of FIG. 2.

Referring to FIGURE 2, the control device 13 stops the automatic regulation (switches the automatic regulator off) when the current feeding the cell or series of cells has dropped to, for example, 50%, or when the line voltage supplying the voltage stabilizer fails, or when the cell voltage connection 2 is broken or again when the anode effect occurs in the cell connected to the regulator and thereby the actual terminal voltage exceeds the upper limiting voltage. As best shown in FIGURE 5, the control device 13 comprises a circuit that includes a transformer 31, magnetic amplifiers 32, 33 and 34, and entrance and control entry terminals 35, as well as relay exit terminals 36.

Figure 6:
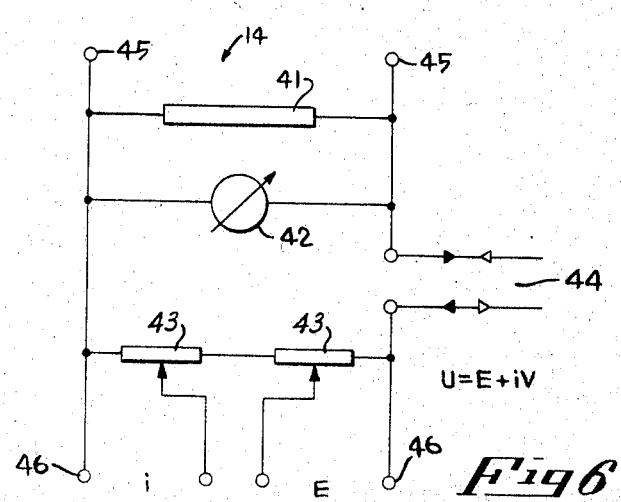
FIG. 6 is a wiring diagram showing in detail a comparator 14 of FIG. 2.

In FIGURE 2, 14 is a comparator of conventional structure, by which the predetermined desired voltage is compared with the actual terminal voltage. As best shown in FIG. 6, the comparator 14 comprises a circuit that includes a resistance 41, and in parallel therewith a voltage meter 42; it further includes two potentiometers 43 and a branch circuit 44 that leads to the amplifier. Between the terminals 45 there is the actual value, while between the terminals 46 the desired or nominal value. When there is a positive or negative difference, that means when the terminal voltage is larger or smaller than the desired voltage, the amplifier 15 receives from the comparator a positive or negative input voltage.

Figure 7:
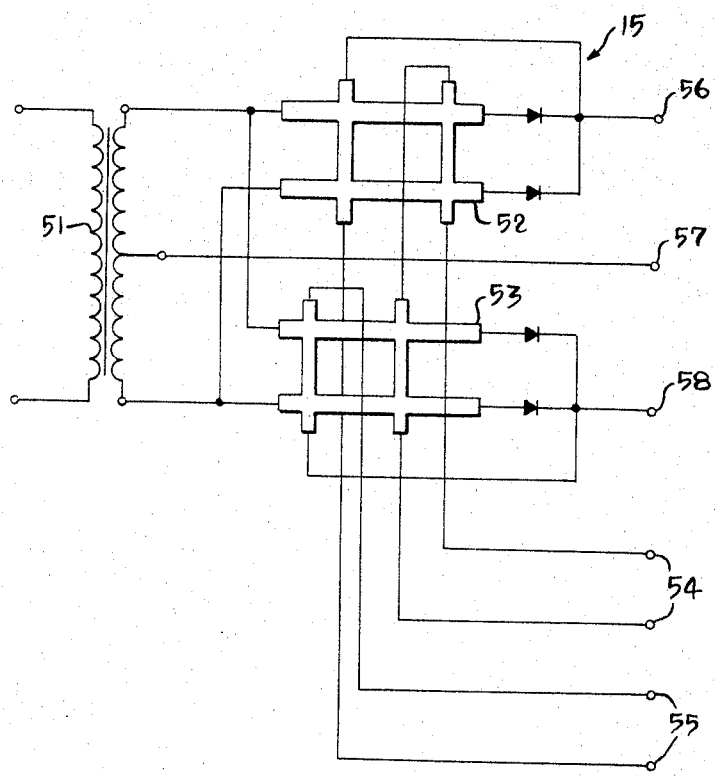
FIG. 7 is a wiring diagram showing in detail an amplifier 15 of FIG. 2.

The amplifier 15 has the necessary means to ensure the desired sensitivity of the regulator (for example ±0.05 v.) and thereby to form the response levels. As best shown in FIG. 7, the amplifier 15 comprises a circuit that includes a transformer 51, two magnetic amplifiers 52 and 53, a pair of "in" terminals 54, a pair of terminals for countercoupling 55, and three terminals 56, 57 and 58; the terminals 56 and 57 are for raising, while the terminals 57 and 58 are for lowering. The counter amplifier 15 sends out pulses. These pulses are proportional to the size of the deviation from the desired or nominal value; the pulses, furthermore, depend on the direction of deviation, and accordingly are "up" pulses for raising and, respectively, "down" pulses for lowering. This is indicated in FIG. 2 by the double lines.

16 is a device for defining the voltage threshold for the purpose of initiating the limitation of the voltage regulation described at the beginning; at the same time, it is intended to interrupt the regulating process (switch the regulator off) upon reaction of the control device 13. The connecting lines with arrows represent symbolically the connection and the direction of operation of the individual devices.

The regulator of the installation according to the invention is composed of the devices 8, 9 and 11 to 16.

the devices 8 and 9 being eliminated when a single cell (and not a series of cells) is equipped with the regulator.

When a single cell which is equipped with its own regulator is concerned, the device 16 must be arranged for the periodic switching on of the regulator; this can be effected by means of known devices. In this case, the devices 8 and 9 are not required; the connection 2 of the electrical control apparatus of the cell is connected to the devices 13 and 14, and the connections 3 and 4 are connected to the device 16.

In order to be able to give each cell in a series an individual desired voltage, an adapting element of well-known construction can be inserted between the electrical control apparatus 1 of each cell and the program switching mechanism 8.

It is an important feature of the method of the invention that regulation is not always effected in the same way, but the regulating pulses produce proportional corrections up to the voltage threshold, whereas beyond this and up to an upper voltage limit differences are reduced periodically, but only to a limited extent.

In connection with the operation of the transductors utilized, the following examples of printed publications are made referenec to:

(1) ETZ (Elektrotechnische Zeitung), edition A (1957), vol. 78, No. 19 (Oct. 1, 1957), p. 712;

(2) Transductortechnik, vol. 3 (1955), pp. 28–36;

(3) R. Zabol, Siemens-Zeitung, vol. 30, No. 2 (1956), pp. 80–91; and (4) The Transductor Amplifier, von Krabbe, K. Munksgard, Copenhagen (1949).

We wish it to be understod that we do not desire to be limited to the exact details of construction shown and described, for obvious modifications will occur to a person skilled in the art.

Having thus described the invention, what we claim as new and desire to be secured by Letters Patent, is as follows:

1. In an installation for the production of aluminum in a fused electrolytic melt in a cell, in which two electrodes serve to transmit current to and from the melt in the cell, and are adjustable to change the distance between them with the aid of a regulator that periodically is connected to the cell and then as needed transmits unit regulating pulses for unit regulating actions, the method of regulating such distance between said electrodes, in accordance with the voltage between them, which comprises the steps of:

periodically sampling and sensing the voltage between the electrodes during successive spaced equal short time sampling intervals, each respectively defined and occurring within each of a series of successive relatively longer electrolysis periods;

permitting the melt to operate normally and unregulated so long as the electrode voltage, as so sampled, falls within a first voltage range, as a closely limited differential tolerance range containing and straddling a desired and assigned nominal operating voltage, the outer voltage limits of said tolerance range constituting the first response levels for applying regulating action;

applying regulating action for controlling the electrode spacing and voltage to restore the electrode voltage to within said closely limited differential tolerance range if the electrode voltage as sampled and sensed during said short sampling interval has deviated beyond said differential tolerance range but still not beyond a pre-determined second range having a pre-determined outer threshold voltage, such regulating action in this case being such as to apply one or more unit pulse regulating actions to control the electrode spacing to restore said electrode voltage to said tolerance range, and if said sampling and voltage sensing finds the electrode voltage beyond said voltage threshold of said second range, then applying only one unit pulse regulating action to adjust the electrode voltage towards said desired nominal operating voltage value, but only so long as said electrode voltage is less than a predetermined upper voltage limit beyond which anode effect will occur; and suppressing all regulation control, once the electrode voltage has exceeded said upper voltage limit indicating the onset of anode effect, until the introduction of an additional batch of alumina into the bath causes the electrode voltage to fall back into a range for regulative action.

2. A method according to claim 1, in which the duration of the electrolysis periods is from 10 to 20 minutes.

3. A method according to claim 1, in which the period of connection of the regulator to the cell is from ½ minute to about 3 minutes.

4. A method according to claim 1, in which the voltage threshold is from 0.07 to 0.2 v. above the desired voltage.

5. A method according to claim 4, in which the voltage threshold is between 0.08 and 0.15 v. above the desired voltage.

6. A method according to claim 4, in which the voltage threshold is 0.1 v. above the desired voltage.

7. Regulating and control apparatus, for use in automatically regulating the terminal voltage in an electrolysis furnace for the electrolytic production of aluminum in a fused fluoride melt through which an operating current is transmitted through two electrodes, and the voltage between the electrodes is adjustably varied for regulation by varying the distance between them, said apparatus comprising:

voltage sensing means;

means for periodically connecting said sensing means to said electrodes;

means responsive to said sensing means for controlling the relative spacing between said electrodes; and means responsive to said sensing means: (1) for preventing operation of said spacing controlling means when the electrode voltage is within a limited tolerance range across a nominal desired value; (2) for establishing limited operation of said spacing control means when the terminal voltage deviates to a value between said nominal value and a small threshold voltage beyond the limits of said limited tolerance range; (3) for establishing a lower order of limited operation of said spacing control means when the voltage exceeds said threshold value and is less than a voltage limit indicating onset of anode effect; and (4) for suppressing and preventing operation of said spacing controlling means when said electrode voltage exceeds the voltage limit that indicates onset of anode effect.

8. In a regulating apparatus, as claimed in claim 7, said responsive means responding to the attainment by said voltage of an upper limiting voltage depending on said nominal voltage.

9. In a regulating apparatus, as claimed in claim 7, said means responsive to said sensing means including a special device operable for determining the response levels, an amplifier, said special device being connected to said amplifier and being operable to block the energization of the regulation until the sensed voltage deviations of the voltage surpass the response levels.

10. In a regulating apparatus, as claimed in claim 7, said control means comprising a build-up device operable to generate said nominal voltage, comprising an adjustable equal voltage stabilizer component and a measuring value converter component serving to conduct an equal voltage proportional to the electrolysis current, said build-up device being operable to generate said nominal voltage by adding the partial voltages delivered by said stabilizer and said converter.

11. In a regulating apparatus, as claimed in claim 10, and means operative for controlling said build-up device and operable to terminate said regulation when the voltage delivered by either component sinks below a predetermined lower voltage limit.

12. In a regulating apparatus, as claimed in claim 7, said spacing controlling means including a regulator being operable to regulate a plurality of furnaces, and a programming switch operable to establish periodically the connection between said regulator and a selected furnace among the furnaces to be regulated.

13. In an apparatus, as claimed in claim 12, said programming switch switch including a timing device for the automatic connection between the individual furnaces and the regulator.

References Cited

UNITED STATES PATENTS

| | | | |
|---|---|---|---|
| 3,317,413 | 5/1967 | Chambran | 204—243 XR |
| 3,329,592 | 7/1967 | Uhrenholdt | 204—243 XR |
| 1,396,919 | 11/1921 | Brace | 204—225 |
| 2,545,411 | 3/1951 | Perret-Bit | 204—255 |
| 2,545,412 | 3/1951 | Perret-Bit | 204—225 |
| 2,545,413 | 3/1951 | Perret-Bit | 204—225 |
| 2,560,854 | 7/1951 | Ferrand | 204—228 X |
| 2,606,869 | 8/1952 | Perret-Bit | 204—225 |
| 2,731,412 | 1/1956 | Ferrand | 204—243 X |
| 2,933,440 | 4/1960 | Greenfield | 204—67 |
| 2,939,824 | 6/1960 | Greenfield | 204—243 X |

JOHN H. MACK, *Primary Examiner.*

DONALD R. VALENTINE, *Assistant Examiner.*

U.S. Cl. X.R.

204—225, 245